United States Patent
Ohie et al.

(10) Patent No.: US 7,409,573 B2
(45) Date of Patent: Aug. 5, 2008

(54) MICRO-CONTROLLER HAVING USB CONTROL UNIT, MC UNIT AND OSCILLATING CIRCUIT COMMONLY USED BY THE USB CONTROL UNIT AND THE MC UNIT

(75) Inventors: Mitsuya Ohie, Kanagawa (JP); Kyotaro Nakamura, Tokyo (JP); Shuichi Hashidate, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 163 days.

(21) Appl. No.: 11/154,718

(22) Filed: Jun. 17, 2005

(65) Prior Publication Data

US 2005/0235172 A1    Oct. 20, 2005

Related U.S. Application Data

(63) Continuation of application No. 09/963,589, filed on Sep. 27, 2001, now Pat. No. 6,938,108.

(30) Foreign Application Priority Data

Sep. 29, 2000 (JP) ............................. 2000-299676
Jun. 12, 2001 (JP) ............................. 2001-177492

(51) Int. Cl.
  G06F 1/00    (2006.01)
  G06F 1/04    (2006.01)
  G06F 3/00    (2006.01)
(52) U.S. Cl. .......................... 713/500; 713/600; 710/18
(58) Field of Classification Search ................. 713/500, 713/320, 323, 600; 710/18, 313
See application file for complete search history.

(56) References Cited

U.S. PATENT DOCUMENTS

| 5,586,308 | A | 12/1996 | Hawkins et al. |
| 6,085,325 | A | 7/2000 | Jackson et al. |
| 6,272,644 | B1 | 8/2001 | Urade et al. |
| 6,467,042 | B1* | 10/2002 | Wright et al. ............... 713/320 |

* cited by examiner

*Primary Examiner*—Suresh K Suryawanshi
(74) *Attorney, Agent, or Firm*—Junichi Mimura

(57) ABSTRACT

A micro-controller includes a USB control unit, an MC unit having an operation mode and a stop mode and an oscillating circuit, which is commonly used by the USB control unit and the MC unit. The USB control unit includes a watching circuit for watching a condition of a first data and a second data, which is complement data of the first data. The operation of the oscillating circuit is controlled in response to an operation control signal, which is generated by a watching result, and an oscillation control signal whose voltage level is changed in response to the mode of the MC unit.

21 Claims, 7 Drawing Sheets

MICRO-CONTROLLER HAVING USB CONTROL UNIT, MC UNIT AND OSCILLATING CIRCUIT COMMONLY USED BY THE USB CONTROL UNIT AND THE MC UNIT

CROSS-REFERENCE TO RELATED APPLICATION

This application claims the priority benefit of Japanese Patent Application No. 2001-177492, filed Jun. 12, 2001 and Japanese Patent Application No. 2000-299676, filed Sep. 29, 2000, the entire disclosure of which is incorporated herein by reference. This application is a continuation of application Ser. No. 09/963,589, filed Sep. 27, 2001 now U.S. Pat. No. 6,938,108.

BACKGROUND OF THE INVENTION

1. Field of the invention

This invention relates to a micro-controller used for controlling data-transfer between a main electric device such as a personal computer and a peripheral device such as a printer or a display-panel, more particularly to a micro-controller for transferring data between a main electric and a peripheral device by using an universal serial bus.

2. Description of the Related Art

A computer system includes a main electric device (called as a host, hereinafter) such as a personal computer (PC) for processing several kinds of information and several kinds of peripheral devices such as printers and display-panels. In the computer system, a desired process can be performed by transferring information between the host and peripheral devices.

In recent years, the popularity of some portable electric devices such as digital cameras or memory cards has increased dramatically. By connecting these portable electric devices as a peripheral devices to a PC, information stored in these portable electric devices can be processed in the PC. However, once the PC is turned on, the PC does not recognize the connection with the peripheral devices while the PC is in operation, even if the peripheral devices are connected to the PC. Therefore, it is necessary to turn the PC off and to turn on the PC again for initializing all settings of the PC in order to recognize the connection with peripheral devices.

To avoid these complicated operations, a universal serial bus (USB) is widely used for performing the interface between the host and the peripheral devices easily. When a peripheral device, having a micro-controller of the USB specification acting as a transfer control device, is connected to the PC, the PC recognizes it even if the connection has been made while the PC is activated. Therefore, it is not necessary to turn the PC off, and information stored in the peripheral device can be transferred to the PC through the USB.

The transfer control device of the USB specification includes an USB control unit and a micro-controller (MC) unit. The USB control unit sends data to the host or receives data from the host though a USB connector, which connects the peripheral device to the host. The MC unit receives data from an internal circuit in the peripheral device and sends data to the internal circuit through an I/O port, which is forming an interface with the internal circuit. The MC unit also controls the USB control unit and the internal circuit as a main control unit.

There are several types of the transfer control device. One of them is a separating-type transfer control device; the other is an incorporating-type transfer control device. The separate-type transfer control device includes a first semiconductor device functioning as the USB control unit and a second semiconductor device functioning as the MC unit, wherein the first and second semiconductor devices are mounted on a single circuit board. The incorporating-type transfer control device include a single semiconductor device having the USB control unit and the MC unit formed on a single semiconductor chip. In these devices, although under the USB 1.1 standard, the USB control unit should be operated by a clock signal having a 48 MHz frequency, the particular frequency of the clock signal used to operate the MC unit is not regulated. Therefore, the MC unit may be operated by a clock signal having a 48 MHz frequency, which is the same frequency as that of the clock signal operating the USB control unit. Further, it is possible to use a clock signal for the MC unit whose frequency is higher than that of the clock signal for the USB control unit when high speed operation is required. On the other hand, the frequency of the clock signal for the MC unit can be lower than that of the clock signal for the USB control unit when low power consumption is required.

In recent years, peripheral devices of low power consumption have been required. To meet this requirement, the MC unit has a function, performed in what may be called a stop mode, for halting its operation, and the USB control unit has a function, performed in what may be called a suspend mode, for halting its operation as well as a stop mode while no communication has been made between the host and the peripheral device.

As described above, in the separate-type transfer control device, each of the first and second semiconductor devices has an oscillating circuit for outputting the oscillation signal generated by an external oscillator. That is, one oscillating circuit is used for the USB control unit, and the other oscillating circuit is used for the MC unit. As does the separate-type transfer control device, the incorporating-type transfer control device has two oscillating circuits for the USB control unit and the MC unit respectively in the single semiconductor device. The reason why these transfer control devices require two oscillating circuits is described below.

On some occasions, the MC unit should be operated when the USB control unit is in the suspend mode, or the USB control unit should be operated when the MC unit is in the stop mode. Therefore, even if one of the units is halted, the clock signal should be sent to the other unit. That is the reason why each unit should have an oscillating circuit. However, the electric power consumed by the oscillating circuit is not negligible small. Further, when there is a phase difference between the clock signals generated by each oscillating circuit, this phase difference cause an operation gap between the USB control unit and the MC unit. Therefore, it is necessary to adjust the operation gap. Furthermore, the cost of the oscillating circuit is not cheap so that the cost of the transfer control unit is also increased. Therefore, the technology for sharing the oscillating circuit between the USB control unit and the MC unit is essential.

However, if the single oscillating circuit is simply used commonly for the USB control unit and the MC unit, the following problems may occur. If the operation of the co-used oscillating circuit is halted completely in response to operation in one of the low power consumption modes, which are the suspend mode of the USB control unit and the stop mode of the MC unit, the MC unit can not perform any process or the USB control unit can not receive any data from the host. Therefore, the, operation of the co-used oscillating circuit can not be halted completely in response to operation in one of the low power consumption modes. On the other hand, when the co-used oscillating circuit is normally operated regardless the low power consumption modes of the USB control unit and of the MC unit, power consumption will be increased so that the benefit of the low power consumption of the transfer control device can not be expected. Further, in a BUS-POWERED method ruled in the USB standard that power for the micro-controller in the peripheral device receives from the host through the USB, it is difficult to operate the oscillating circuit all the time because of the current flow restriction of the USB control unit in the suspend mode. Specifically, the low power consumption for the portable electric device whose power is supplied from batteries is highly required because the micro-controller as the transfer control device is installed therein. That is, the increase of the power consumption on the micro-controller should be avoided.

SUMMARY OF THE INVENTION

It is therefore an object of the invention to resolve the above-described problem and to provide a micro-controller having an USB control unit, a MC unit and a single oscillating circuit commonly used by the USB control unit and MC unit whereby a low cost and a low power consumption micro-controller can be presented.

Another object of the invention is to provide a one-chip micro-controller.

Yet another object of the invention is to provide a micro-controller, which receives data transferred certainly.

A further object of the invention is to provide the above-described micro-controller without any complicated control and without increasing the circuit components.

These objects are achieved by a micro-controller controlling a data transfer to or from a host device through a pair of data lines for transferring a first data at the first data line and a second data at the second data line, which is different from the first data respectively, including an internal circuit, a transfer control unit, a main control unit and an oscillating circuit. The transfer control unit, which is operated in response to the oscillation signal from the oscillating circuit, for watching a condition of the data transfer at the pair of the data lines, and outputting a first output signal as a watching result. The transfer control unit has a function for receiving the first data and the second data and for transferring a desired data to the host device through the pair of data lines. The main control unit, which is operated by the oscillation signal, receives the first output signal from the transfer control unit, and controls an operation of the internal circuit in response to the first output signal. The main control unit changes its mode from an operative mode to an inoperable mode or from the inoperative mode to the operable mode in response to the watching result. The main control unit outputs a second signal when the main control unit is in the inoperative mode The oscillating circuit, which generates the oscillation signal having a first frequency, is inactivated in response to the second signal, and is activated in response to the watching result when the main control unit returns to the operable mode.

Further, a micro-controller may have a clock signal generating circuit, which generates a clock signal having a second frequency that is higher than the first frequency by receiving the oscillation signal and sends the clock signal to the transfer control unit, the transfer control unit being operated by the clock signal. Furthermore, the operation of the clock signal generating circuit may be controlled in response to the watching result.

Moreover, the transfer control unit may send the main control unit the watching result showing that the main control unit is allowed to be in the inoperable mode when transfer control unit detects the condition showing that the voltage level of the first data is at the first level and the voltage level of the second data is at the second level, which is different from the first level, for a particular period. Further, the transfer control unit may send the oscillating circuit the watching result for instructing the generation of the oscillation signal by detecting the condition showing that the voltage level of the first data is at the second level and the voltage level of the second data is at the first level while the main control unit is in the inoperable mode.

Furthermore, the transfer control unit may send the main control unit the watching result showing that the main control unit is allowed to return to the operable mode when the transfer control unit detects the condition for a particular period showing that the voltage levels of the first and second data are at the second level.

Moreover, the transfer control unit and the main control unit may be formed on a single semiconductor chip.

The above and further objects and novel features of the invention will more fully appear from the following detailed description, appended claims and accompanying drawings.

DETAILED DESCRIPTION OF THE PREFERRED EMBODIMENTS

First Preferred Embodiment

Figure 1:
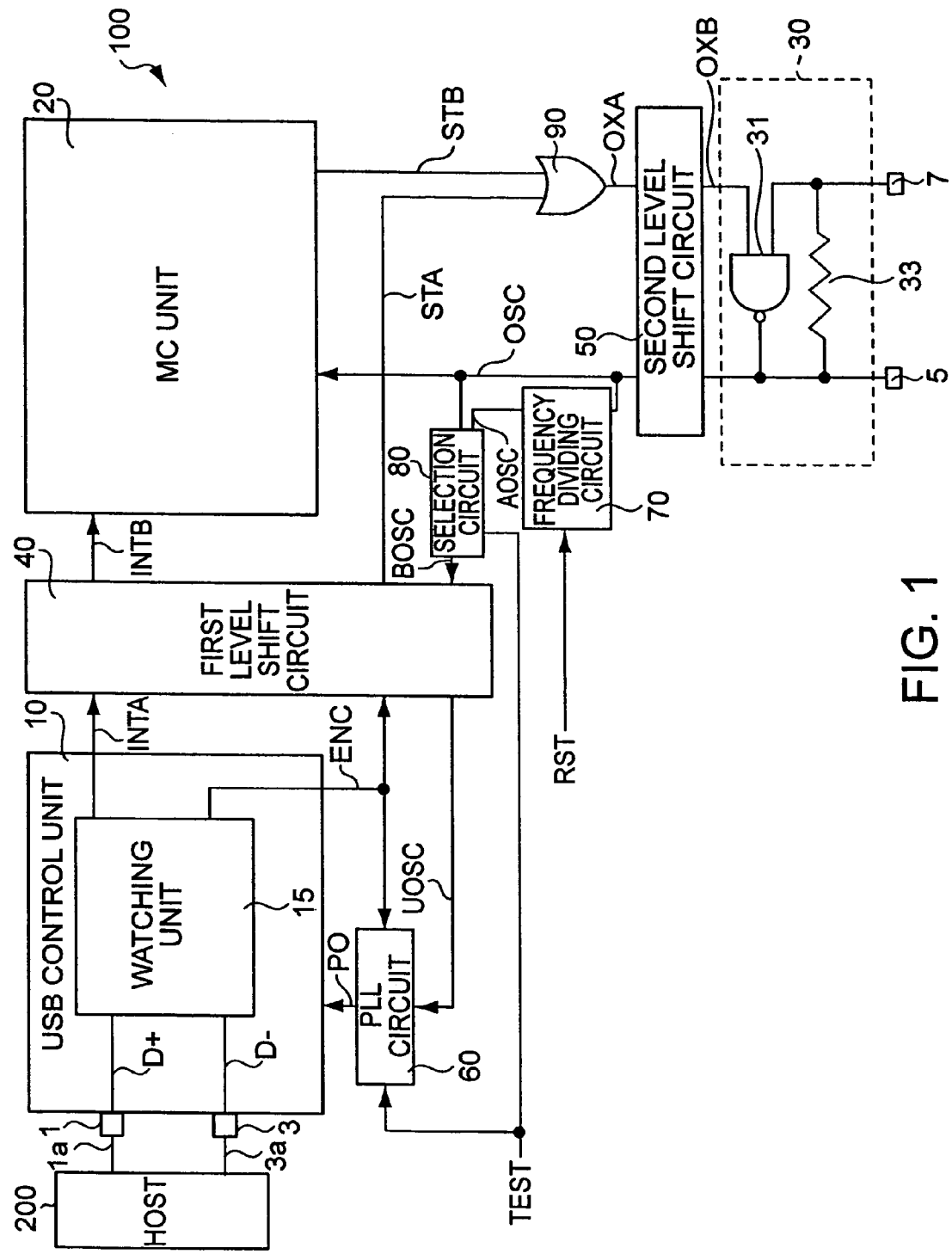
FIG. 1 is a circuit diagram of a micro-controller according to a first embodiment of the invention.

Referring to FIG. 1, a micro-controller 100 includes an USB control unit 10 acting as a data transfer control unit, an MC unit 20 acting as a main control unit and an oscillating circuit 30. The USB control unit 10 includes a first data terminal 1 and a second data terminal 3. The USB control unit 10 receives a first data D+, which is transferred from a host device 200 such as a computer through a first data line 1a, at the first terminal 1, and sends another first data D+, which is created in the micro-controller, at the first terminal 1. The USB control unit further receives a second data D−, which is transferred from a host device 200 through a second data line 3a, at the second terminal 3, and sends another second data D−, which is created in the micro-controller, at the second terminal 3. The voltage levels of the first and second data D+, D− are complementary. Therefore, the receiver can recognize the transferred data correctly by comparing the difference between the first and second data D+, D− at the receiver.

The USB control unit 10 includes a watching unit 15 for detecting a suspend mode, which is a low power consumption mode, to let the USB control unit 10 inactivate, and for detecting a resume mode to let the USB control unit 10 activate in order to resume operation of the USB control unit 10. The detailed circuitry of the watching unit 15 is described below.

The watching unit 15 outputs an operation control signal ENC as a result of watching the status whether or not the USB control unit 10 should be in the suspend mode, and also outputs an interrupt control signal INTA as a result of watching the status as to whether or not the operation of the USB control unit 10 should be resumed. The operation control signal ENC is a control signal for controlling the activation or the halt of the oscillating circuit 30, and the interrupt control signal INTA is a control signal for instructing the MC unit 20 to allow to be in the stop mode or to release the stop mode. The watch unit 15 outputs the operation control signal ENC having a low voltage level (L level) such as ground level when the watch unit 15 detects that the USB control unit 10 is in a condition to switch its mode to the suspend mode, and the watch unit 15 outputs the operation control signal ENC having a high voltage level (H level) such as power supply voltage level when the watch unit 15 detects that the USB control unit 10 is in a condition to resume its operation. The voltage level of the operation control signal ENC is maintained at the H level when the watch unit 15 does not detect the condition that the USB control unit 10 should be in the suspend mode. The watch unit 15 outputs the interrupt control signal INTA having the L level when the watch unit 15 detects that the MC unit 20 is in a condition to be in the stop mode, and the watch unit 15 outputs the interrupt control signal INTA having the H level when the watch unit 15 detects that the USB control unit 10 is in a condition to release the stop mode. The voltage level of the interrupt control signal INTA is maintained at the H level when the MC unit 20 is not allowed to be in the stop mode. According to the first embodiment of the invention, although both the operation control signal ENC and the interrupt control signal INTA have single-bit data, they may have plural-bits data when the USB control unit 10 outputs the other data or when receiver's circuit can accept the plural-bit data. However, if these signals having single-bit data are used, the total cost of the micro-controller can be saved because the receiver of the data can be made of a simple logic circuit.

The USB control unit 10 connects to a phase locked loop circuit 60 (PLL circuit). The PLL circuit 60 receives an oscillation signal UOSC, which is generated in response to a oscillation signal OSC from the oscillating circuit 30, and outputs a clock signal PO having a frequency adjusted to the USB control unit 10, in response to the oscillation signal UOSC, to the USB control unit 10. In the first embodiment of the invention, in view of the low power consumption at the MC unit 20, the operation speed of the MC unit 20 is slower than that of the USB control unit 10. For example, the MC unit 20 is operated by the clock signal based on the oscillation signal of 12 MHz, and the USB control unit 10 is operated by the clock signal based on the oscillation signal of 48 MHz according to the USB 1.1 standard. In this case, when the oscillating circuit 30 generates the oscillation signal OSC of 12 MHz, the PLL circuit 60 generates the clock signal PO of 48 MHz from the oscillation signal OSC of 12 MHz. When the PLL circuit 60 includes a voltage control oscillator (called as a VCO) having a ring oscillator of a high frequency oscillator clock source, the frequency of the signal inputted can be changed. Further, it is possible to use the PLL circuit 60, which can generate the clock signal having the desired frequency from the oscillation signal UOSC. In FIG. 1, although the PLL circuit 60 is placed outside of the USB control unit 10, the PLL circuit 60 may be incorporated in the USB control unit 10 because the PLL circuit 60 is used for the USB control unit 10. When the PLL circuit 60 is incorporated in the USB control unit 10, it is possible to avoid the malfunction of the micro-controller 100. Of course, it is possible to generate the clock signal of 48 MHz by the oscillating circuit 30. In this case, it is not necessary to form the PLL circuit 60 in the micro-controller. However, since the clock signal of 48 MHz is also applied to the MC unit 20 in this case, the operation of the MC unit 20 become fast so that the power consumption for operating the MC unit 20 is increased. Therefore, to meet the requirement of the low power consumption, the clock signal of 48 MHz should be only applied to the USB control unit 10 and the MC unit 20 should be operated by the clock signal having a frequency (such as 12 MHz or 6 MHz), which is required to operate the system so that the PLL circuit 60 should be formed. Further, when the MC unit 20 is operated by an oscillation signal whose frequency is higher than that for the USB control unit 10, a frequency dividing circuit 70 whose structure is simpler than that of the PLL circuit 60, may be formed, instead of the PLL circuit 60

The MC unit 20 generates control signals for controlling the operation of the other internal circuit of the micro-controller 100 in response to the first and second data D+, D−, which was originally received by the USB control unit 10. The MC unit 20 further generates control signals for controlling the operation of the other internal circuit of the micro-controller 100 in order to transfer information as the first and second data D+, D− to the host device 200. The MC unit 20 has a stop mode, which make the MC unit 20 inoperative. Therefore, the stop mode can be considered to be a low power mode. The MC unit 20 can be in the stop mode when processing by the MC unit 20 is not necessary. For example, MC unit 20 can be in the stop mode while the first and second data D+, D− are not received at the first and second data terminal 1, 3. Therefore, the MC unit 20 can be in the stop mode regardless the suspend mode of the USB control unit 10.

The interrupt control signal INTA outputted from the USB control unit 10 is level-shifted to an interrupt control signal INTB by a first level shift circuit 40, and then the interrupt control signal INTB is inputted to the MC unit 20. The MC unit 20 recognizes the instruction of the interruption by receiving the interrupt control signal INTB. When the instruction of the interruption shows that the operation mode of the USB control unit 10 is changed to the suspend mode, the MC unit 20 recognizes that the MC unit 20 is allowed to be in the stop mode. For example, when the voltage level of the interrupt control signal INTB is changed from the H level to the L level in response to the change of the voltage level of the interrupt control signal INTA from the H level to the L level, the MC unit 20 is allowed to be in the stop mode. Also, when the operation of the USB control unit 10 is resumed, the voltage level of the interrupt control signal INTB is changed from the L level to the H level in response to the change of the voltage level of the interrupt control signal INTA from the L level to the H level. The MC unit 20 detects the change of the voltage level of the interrupt control signal INTB from the L level to the H level, the stop mode of the MC unit 20 is changed to the operation mode. These interruption processes themselves are performed by software control. When the MC unit 20 is not allowed to be in the stop mode, the voltage level of the interrupt control signal INTB is maintained at the H level in response to the interrupt control signal INTA having the H level.

According to the first embodiment of the invention, the first level shift circuit 40 is required because the power supply voltage of the USB control unit 10 is different from that of the MC unit 20. To meet the requirement for the low power consumption, the micro-controller is designed in a way that the power supply voltage of the MC unit 20 can be set lower than that of the USB control unit 10. For example, the power supply voltage of the USB control unit 10 is set at 3.3 V, and the power supply voltage of the MC unit 20 is set in the range of 2.5-3.6 V. Therefore the voltage of the H level signal, which the USB control unit 10 outputs or inputs, is different from the voltage of the H level signal that the MC unit 20 outputs or inputs. As to the L level signal, since the voltage of the L level signal, which is outputted from or inputted to the USB control unit 10 or the MC unit 20, is set at ground level, it is not necessary to level-shift the L level signal. However, it is not necessary to set the L level signal to ground voltage. Therefore, the voltage of the L level signal, which the USB control unit 10 outputs or inputs, may be different from the voltage of the L level signal that the MC unit 20 outputs or inputs. When the power supply voltage for the USB control unit 10 is the same as that for the MC unit 20, it is not necessary to form the first level shift circuit 40 and a second level shift circuit 50, as explained below.

The MC unit 20 outputs an oscillation control signal STB. The voltage level of the oscillation control signal STB is changed in response to the mode of the MC unit 20. For example, when the USB control unit 10 is put in the suspend mode, the interrupting operation is performed to put the MC unit 20 in the stop mode. As a result, the voltage level of the oscillation control signal STB is changed to the L level. When the operation of the USB control unit 10 is resumed, the interrupting operation is performed to put the MC unit 20 in the operation mode. As a result, the voltage level of the oscillation control signal STB is changed to the H level.

The oscillating circuit 30 includes a first terminal 5 and a second terminal 7, each of which is connected to an external ceramic oscillator or an external crystal oscillator. The oscillating circuit 30 further includes a feedback resistor 33 connected between the first and second terminals 5, 7 and a NAND gate 31 having one output and two inputs. The feedback resistor 33 can be replaced by a MOS transistor. In this case, on-resistance of the MOS transistor acts as the feedback resistor. Further, the feedback resistor 33 can be formed as an external feedback resistor. When an external feedback resistor is used, the feedback loop between the first and second terminals 5, 7 is not formed normally. Therefore, the voltage level of the output signal from the NAND gate 31 should be the fixed voltage such as the L level, so that a test signal can be inputted to one of the first and second terminals 5, 7 easily. The test signal can be sent easily to the internal circuit, which also can receives the signals from the USB control unit 10, the MC unit 20 and the first and second terminals 5, 7.

The NAND gate 31 receives an oscillation signal, which was generated by the external ceramic oscillator or the external crystal oscillator, through the second terminal 7 at one of its inputs. The NAND gate 31 also receives an output signal OXB from the second level shift circuit 50 at the other input. The output signal OXB is level-shifted from an output signal OXA of an OR gate 90 by the second level shift circuit 50. The output of the NAND gate 31 is connected to the first terminal 5. Similarly to the level shift circuit 40, the second level shift circuit 50 is formed because the power supply voltage of the oscillating circuit 30 is different from that of the MC unit 20. Therefore, when the oscillating circuit 30 and the MC unit 20 use the same voltage value as the power supply voltage, the second level shift circuit 50 is not required to be formed.

The OR gate 90 receives an operation control signal STA at one of these inputs and receives the oscillation control signal STB outputted from the MC unit 20 at the other input. The operation control signal STA is level-shifted from the operation control signal ENC by the first level shift circuit 40. Although the level shift circuit 40 changes the voltage level of the input signal, the logic level is not changed. Therefore, when the operation control signal ENC having the H level is inputted to the first level shift circuit 40, the operation control signal STA having the H level is outputted from the first level shift circuit 40. According to the OR gate 90, both when the voltage level of the operation control signal ENC is changed to the L level in response to the detection of the suspend mode, and when the voltage level of the oscillation control signal STB is changed to the L level in response to the interruption operation, which is performed in the MC unit 20 based on the detection of the suspend mode of the USB control unit 10, the voltage level of the output signal OXA of the OR gate 90 is changed to the L level. The OR gate 90 outputs the output signal OXA having the H level in another condition. In other words, even if the voltage level of the operation control signal is at the L level in response to the MC unit 20 being in the stop mode, the voltage level of the output signal OXA of the OR gate 90 can be changed to the H level without releasing the MC unit 20 from the stop mode, when the voltage level of the operation control signal ENC is changed to the H level when the operation of the USB control unit 10 is resumed. Therefore, the 10 oscillating circuit 30 is activated immediately by the output signal OXA having the H level.

Further, even if both the operation control signal STA and the oscillation control signal STB are at the L level in response to the USB control unit 10 being in the suspend mode and the MC unit 20 being in the stop mode, the voltage level of the output signal OXA of the OR gate 90 can be changed to the H level without waiting the detection of the resume signal, by releasing the stop mode of the MC unit 20. Therefore, the oscillating circuit 30 is activated immediately by the output signal OXA having the H level.

Although the output signal OXB is level-shifted from the output signal OXA, the logic level of output signal OXB is the same as that of the output signal OXA. Therefore, while the logic level of the output signal OXB is at the H level, the oscillating circuit 30, which is connected to the external oscillator, generates the oscillation signal. As a result, the oscillation signal OSC is outputted from the oscillating circuit 30 through the second level shift circuit 50. While the logic level of the output signal OXB is at the L level, the oscillating circuit 30 is restrained to generate the oscillation signal. As a result, the output of the oscillating circuit 30 is fixed to the H level. As described above, since the voltage level of the output signal OXB can be controlled by the operation control signal ENC, it is possible to control the generation of the oscillation signal OSC regardless of the mode of the MC unit 20.

In the first embodiment shown in FIG. 1, the oscillation signal OSC is inputted to the MC unit 20 as a clock signal for the MC unit 20, and also inputted to the first level shift circuit 40 though the frequency dividing circuit 70 and a selection circuit 80. Then, the level-shifted oscillation signal UOSC is inputted to the PLL circuit 60. It is not necessary to provide the frequency dividing circuit 70 and the selection circuit 80. However, the following benefit can be obtain if these are provided.

The frequency dividing circuit 70 divides the frequency in half. For example, when the oscillation signal OSC having the 12 MHz is inputted to the frequency dividing circuit 70, the frequency dividing circuit 70 outputs an oscillation signal AOSC having a frequency of 6 MHz. If the USB control unit 10 requires the clock signal having a frequency of 48 MHz, the PLL circuit 60 multiplies the frequency of the level-shifted oscillation signal UOSC by 8. Further, if the frequency dividing circuit 70 is connected to a reset terminal at which a reset signal RST is applied, the oscillation signal AOSC can be reset at any time. Therefore, if there are phase differences between the signals applied to the MC unit 20 and the USB control unit 10 or between the signals applied to the other internal circuits and one or both of the MC unit 20 and the USB control unit 10, it is easily to synchronize the phase of these signals by the reset signal RST. In this embodiment, although the frequency dividing circuit 70 divides the frequency of the inputted signal in half, the frequency dividing circuit 70 can be modified to let the frequency of the inputted signal be divided by any other positive number. As described above, by forming the frequency dividing circuit 70 in the micro-controller 100, it is possible to generate the clock signal having 48 MHz, which is required by the USB control unit 10, by the frequency dividing circuit 70 and by the PLL circuit 60. Therefore, in the case that the oscillating circuit 30 is commonly used by the USB control unit 10 and the MC unit 20, when the frequency dividing circuit 70 is formed in the micro-controller 100, the oscillation signal having a frequency in a wide range can be output from the oscillating circuit 30. The frequency of the oscillating circuit 30 is determined by performance of the MC unit 20. Therefore, an oscillating circuit 30, which is capable of generating an oscillation signal having a frequency in the range between a few MHz and a few tens of MHz, is desirable. According to the first embodiment, since the oscillating circuit 30 is capable of outputting an oscillation signal with a frequency in the range of a few MHz and few tens of MHz, the micro-controller 100 can be designed easily, and flexibility in setting the frequency of the oscillation signal to be generated can be improved.

The selection circuit 80 selects one of the frequency divided oscillation signal AOSC and the oscillation signal OSC by receiving a selection signal TEST, and then outputs the oscillation signal BOSC to the first level shift circuit 40. The selection signal TEST is a kind of test signal. While the micro-controller 100 is activated, the voltage level of the selection signal TEST is at the L level. In this condition, the frequency divided oscillation signal AOSC is outputted from the selection circuit 80 as the oscillation signal BOSC. In a test mode of the micro-controller 100, the voltage level of the selection signal TEST is changed to the H level. When the voltage level of the selection signal TEST is changed to the H level, the oscillation signal OSC is outputted from the selection circuit 80 as the oscillation signal BOSC. Since high-speed operation is required in the test mode, the system of the micro-controller 100 should be operated by a clock signal having a frequency, which equals to that the signal applied to the MC unit 20. Further, according to the first embodiment, the test signal is also inputted to the PLL circuit 60. During the test mode, the operation of the PLL circuit 60 is halted by the selection signal TEST having the H level. Therefore, it is possible to input the oscillation signal BOSC, which is the oscillation signal OSC, to the USB control unit 10 without processing the oscillation signal BOSC by the PLL circuit 60. If the selection signal TEST is not inputted to the PLL circuit 60, the PLL circuit 60 is not halted. In such a case, when the oscillation signal BOSC is inputted to the PLL circuit 60, the phase-lock operation is performed in the PLL circuit 60 so that it takes a long time to output the stable clock signal PO. To reduce the test time, the output from the selection circuit 80 is inputted the USB control unit 10 directly in the first embodiment. While the voltage level of the selection signal TEST is at the L level, the PLL circuit 60 is in the operation mode. Also, although the oscillation signal UOSC is level-shifted from the oscillation signal BOSC by the first level shift circuit 40, the logic level of the oscillation signal UOSC is the same as that of the oscillation signal BOSC.

Figure 2:
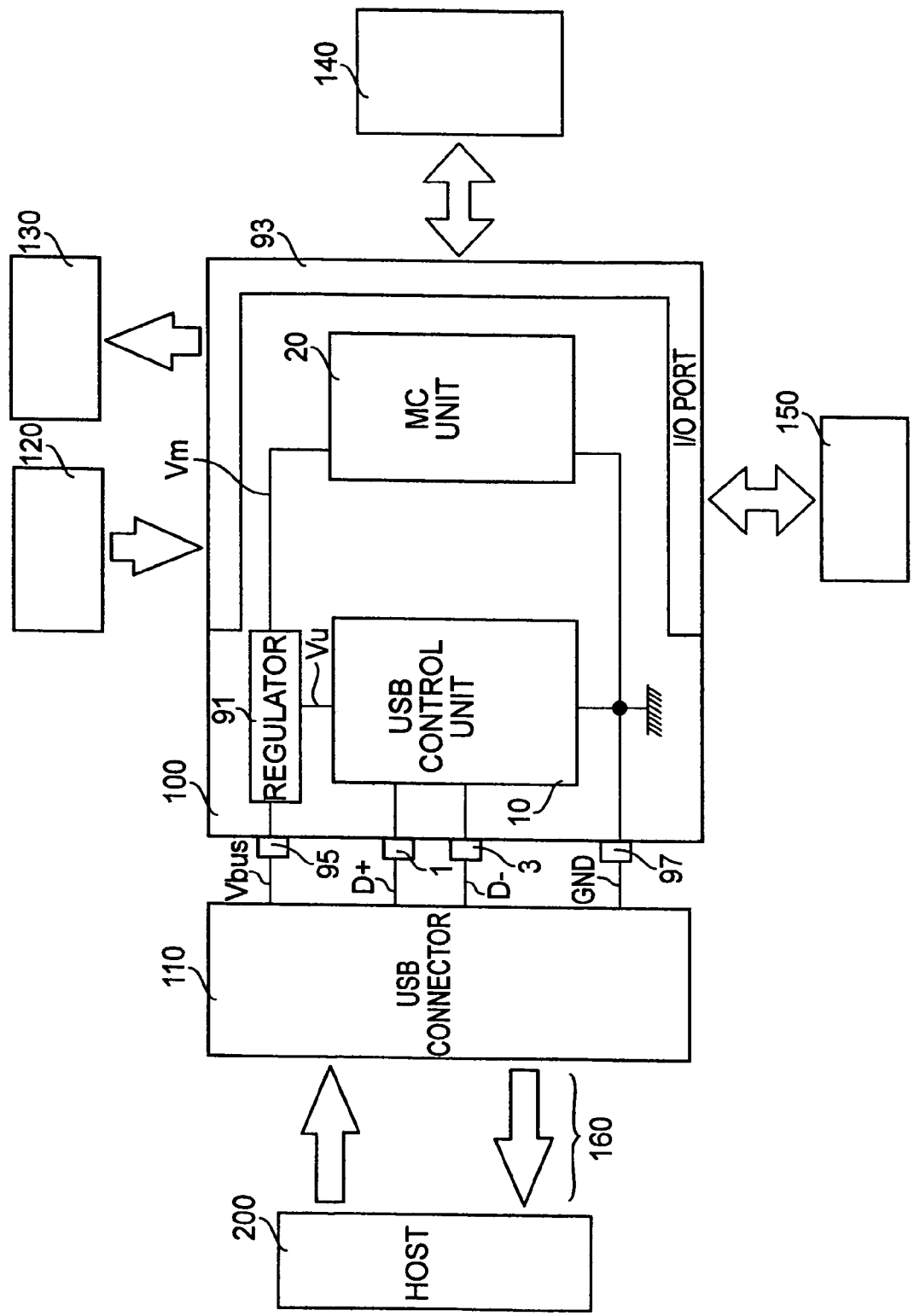
FIG. 2 is a diagram showing a total system utilizing the micro-controller of FIG. 1.

The micro-controller 100 shown in FIG. 1 is utilized in a system shown in FIG. 2. The micro-controller 100 is formed of a single semiconductor chip or is formed of two semiconductor chips. The single semiconductor chip or the two semiconductor chips are sealed by resin material to form a single semiconductor device. When the micro-controller 100 is formed of the two semiconductor chips, one of the two semiconductor chips includes the oscillating circuit 30 and the its output terminal, and the other semiconductor chip includes input terminal for receiving the oscillation signal from the oscillating circuit 30. The output terminal and the input terminal may be connected by a wire before being sealed by the resin material.

Referring to FIG. 2, the micro-controller includes an I/O port 93 acting as an input/output interface with the peripheral devices 120, 130, 140, 150 and a regulator 91 for generating a desired power supply voltage in addition to the USB control unit 110 and the MC unit 20. The micro-controller further includes a Vbus terminal 95 for receiving the other voltage Vbus and a GND terminal 97 for receiving the ground voltage in addition to the first and second terminal 1, 3, which are connected to a USB connector 110. Input and output operations of the signals and voltages between the host device 200 and the micro-controller 100 are performed by using the terminals 1, 3, 95, 97 through a bus 160. The voltage Vbus is supplied from the host device 200, which may be a PC, and is supplied to the regulator 91. The regulator 91 generates a power supply voltage Vu for the USB control unit 10 and a power supply voltage Vm for the MC unit 20, and supplies the power supply voltages Vu, Vm to the USB control unit 10 and the MC unit 20, respectively. As described above, the method by which the power supply voltage is supplied from the host device 200 is called a BUS-POWERED method. In the system shown in FIG. 2, although the BUS-POWERED method is used, it is not necessary to use the BUS-POWERED method. In the system shown in FIG. 2, the power supply voltages Vbus, Vu, Vm are set at 5 V, 3.3 V and 2.5 V, respectively. A power supply voltage of 3.3 V is applied to the I/O port 93 as well as the power supply voltage Vu The I/O port 93 is used for inter-transferring information among the peripheral devices 120, 130, 140, 150, such as digital portable devices including printers and digital cameras, modems, display panels and memory cards. The micro-controller 100 connects to the peripheral devices through the I/O port 93 and connect to the host device 200 through the USB connector 110 in order to inter-transfer data.

Referring back to FIG. 1, the watching unit 15 is explained with reference to FIGS. 3 and 4. As described above, the watching unit 15 detects the suspend mode and the resume mode. A suspend detection circuit 300 of the watching unit 15 is illustrated in FIG. 3, and a resume detection circuit 400 of the watching unit 15 is illustrated in FIG. 4.

Figure 3:
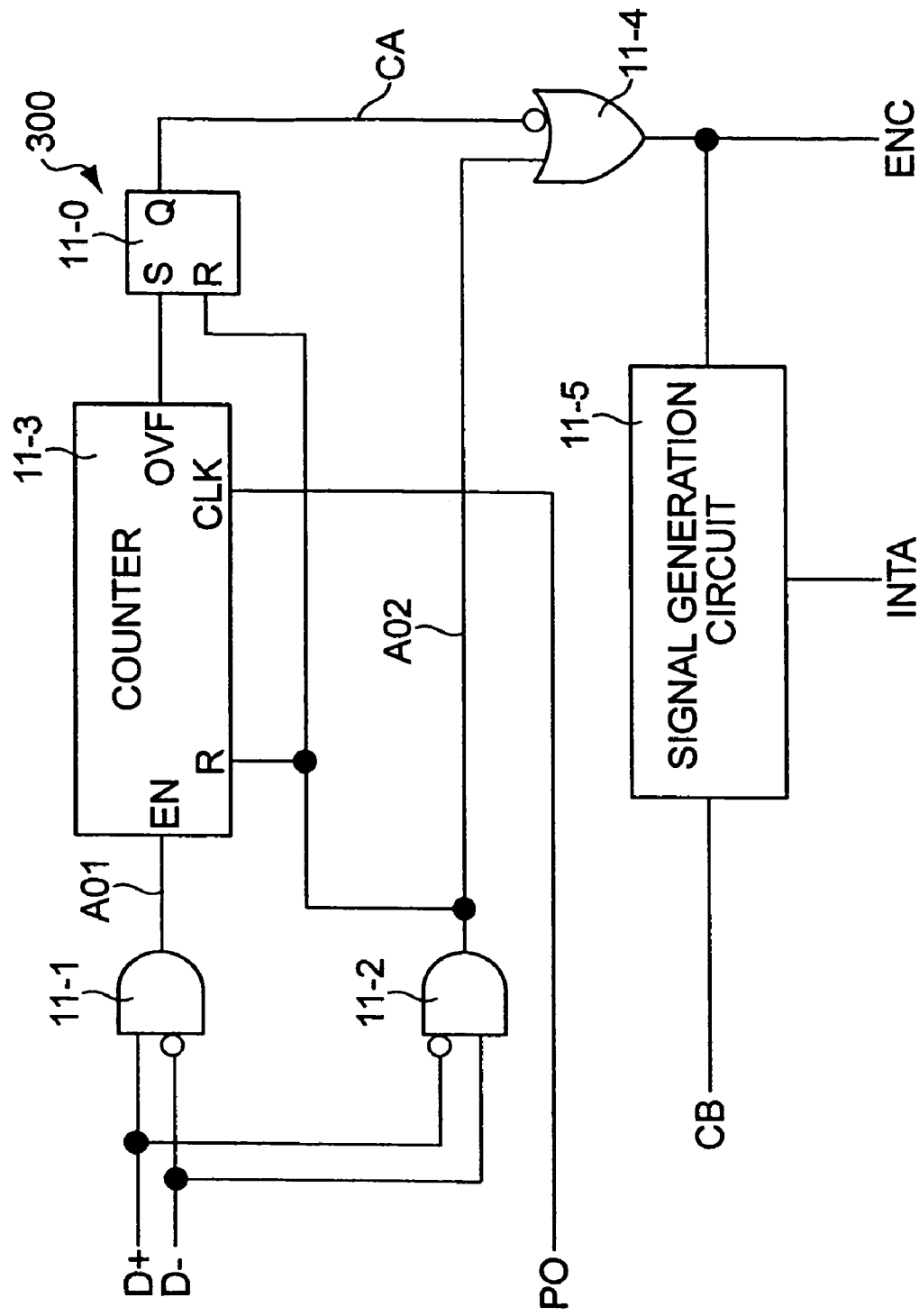
FIG. 3 is a circuit diagram of a suspend mode detecting unit in a watching unit 15 of the micro-controller of FIG. 1.
Figure 4:
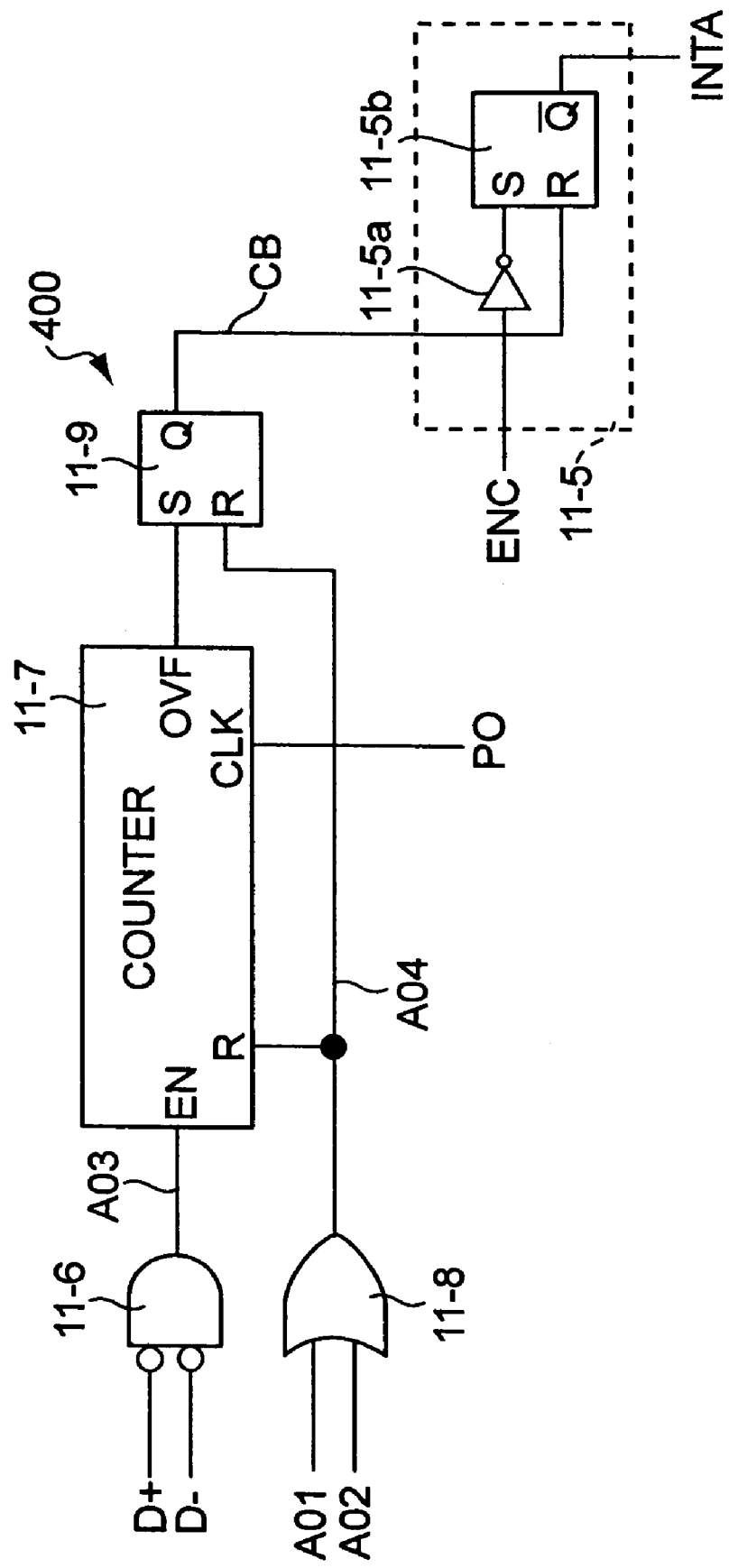
FIG. 4 is a circuit diagram of a resume mode detecting unit in a watching unit 15 of the micro-controller of FIG. 1.

Referring to FIG. 3, the suspend detection circuit 300 includes a first AND gate 11-1 having two inputs and one output, a second AND gate 11-2 having two inputs and one output, a counter 11-3, an OR gate 11-4 having two inputs and one output, a signal generation circuit 11-5 for generating the interrupt control signal INTA, and a RS flip-flop circuit 11-0. The first AND gate 11-1 receives the first data D+ at one of its two inputs, and receives the reversed data of the second data D− at its other input. The second AND gate 11-2 receives the reversed data of the first data D+ at one of its two inputs, and receives the second data D− at its other input. As described above, the voltage levels of the first and second data D+, D− are complementary. A first output signal A01 from the first AND gate 11-1 is inputted to an enable terminal EN of the counter 11-3, and a second output signal A02 from the second AND gate 11-2 is inputted to a reset terminal R of the counter 11-3.

The counter 11-3 is activated when the second output signal A02 having the L level is inputted to the reset terminal R and when the first output signal A01 having the H level is inputted to the enable terminal EN, and then, starts to count the number of the pulse of the clock signal PO, which is inputted to an input terminal CLK of the counter 11-3. Further, when the second output signal A02 having the H level is inputted to the reset terminal R, the counter is reset and initialized. When the counting result of the counter 11-3 reaches a predetermined number, the counter 11-3 outputs an overflow signal having the H level from an output terminal OVF to a set terminal S of the RS flip-flop circuit 11-0. Upon receiving the overflow signal having the H level, the RS flip-flop circuit 11-0 outputs a completion signal CA having the H level from its output terminal Q, and maintains the voltage level of the completion signal CA at the H level. The RS flip-flop circuit 11-0 also receives the second output signal A02 from the second AND gate 11-2, at its reset terminal R. While the voltage level of the second output signal A02 is at the L level, the RS flip-flop circuit 11-0 maintains the voltage level of the completion signal CA. When the voltage level of the second output signal A02 is changed to the H level, the voltage level of the completion signal CA is changed to the L level. Until the counting result of the counter 11-3 has not reached the predetermined number, the voltage level of the completion signal CA is maintained at the L level.

The OR gate 114 receives the reversed signal of the completion signal CA at the one of its two inputs, and received the second output signal A02 from the second AND gate 11-2 at its other input. The OR gate 114 outputs the operation control signal ENC. The signal generation circuit 11-5 outputs the interrupt control signal INTA having the L level when the voltage level of the operation control signal ENC is changed to the L level. The signal generation circuit 11-5 maintains the interrupt control signal INTA having the L level until the signal generation circuit 11-5 is instructed by the completion signal CA, which lets the voltage level of the interrupt control signal INTA change to the H level, even if the voltage level of the operation control signal ENC is changed to the H level. The detailed example of the signal generation circuit 11-5 is explained with reference to FIG. 4 below.

The operation of the suspend circuit 300 is explained below. As described above, since the first and second data D+, D− are complementary, when one of the first and second data D+, D− has the H level, the other data always has the L level. The first and second data D+, D− are transferred to the microcontroller at high speed, and the voltage level of each data D+, D− is changed from the H level to the L level or from the L level to the H level very quickly in the data transferring condition. Under this data transferring condition, both the USB control unit 10 and the MC unit 20 can not be in the suspend mode and the stop mode because the USB control unit 10 and the MC unit 20 have to process the transferred data.

However, under the USB 1.1 standard, when the data is not transferred for a particular period, which period is determined by the USB 1.1 standard, the operation mode of the USB control unit 10 is changed to the suspend mode according its communication protocol. So, while the data is not transferred for a particular period, the voltage level of the first data D+ is maintained at the H level and the voltage level of the second data D− is maintained at the L level. Therefore, to detect the timing to let the USB control unit 10 change to the suspend mode, the length of the period that the first data D+ has the H level and the second data D− has the L level, should be detected. When the voltage level of the first data D+ is changed from the H level to the L level before the particular period has passed, the operation mode of the USB control unit 10 is not changed to the suspend mode, and the first data D+ having the L level is recognized as the data including information. To detect the timing, the counter 11-3 is activated by detecting the timing with which the voltage level of the first data D+ is changed to the H level and the voltage level of the second data D− is changed to the L level at the first AND gate 11-1. The counter 11-3 outputs the overflow signal by continuing the counting operation for the particular period, and then the voltage level of the completion signal CA is changed to the H level. Further, the counter 11-3 is reset and initialized by detecting the first data D+ having the L level and the second data D− having the H level at the second AND gate 11-2. The OR gate 11-4 outputs the operation control signal ENC having the L level when the first data D+ is at the H level and the second data D− is at the L level and when the completion signal CA is changed to the H level. Accordingly, the circuit 300 shown in FIG. 3 can detect the USB control unit 10 to be in the suspend mode. Specifically, since the operation control signal ENC and the interrupt control signal INTA are generated independently, the oscillating circuit 30 can be activated while the MC unit 20 is in the stop mode. Namely, the USB control unit 10 can activate the oscillating circuit 30 quickly without operating the software based on the instruction from the MC unit 20.

Referring to FIG. 4, the resume detection circuit 400 includes an AND-gate 11-6 having two inputs and one output, a counter 11-7, an OR gate 11-8 having two inputs and one output, the signal generation circuit 11-5 for generating the interrupt control signal INTA, and a RS flip-flop circuit 11-9. The signal generation circuit 11-5 is commonly used for the resume detection circuit 400 of FIG. 4 and the suspend is detection circuit 300 of FIG. 3. The signal generation circuit 11-5 includes an inverter 11-5a and an RS flip-flop circuit 11-5b.

The AND gate 11-6 receives the reversed data of the first data D+ at one of its two inputs, and receives the reversed data of the second data D− at its other input. A third output signal A03 of the AND gate 11-6 is inputted to an enable terminal EN of the counter 11-7. The OR gate 11-8 receives the first output signal A01 of the first AND gate 11-1 at one of its two inputs, and receives the second output signal A02 of the second AND gate 11-2 at the other input. A fourth output signal A04 of the OR gate 11-8 is inputted to a reset terminal R of the counter 11-7

The counter 11-7 is activated when the fourth output signal A04 having the L level is inputted to the reset terminal R and when the third output signal A03 having the H level is inputted to the enable terminal EN, and then starts to count the number of the pulse of the clock signal PO, which is inputted to a input terminal CLK of the counter 11-7. Further when the fourth output signal A04 having the H level is inputted to the reset terminal R, the counter 11-7 is reset and initialized. When the counting result of the counter 11-7 reaches the predetermined number, the counter 11-7 outputs the overflow signal having the H level from an output terminal OVF to a set terminal S of the RS flip-flop circuit 11-9. Upon receiving the overflow signal having the H level, the RS flip-flop circuit 11-9 outputs a completion signal CB having the H level from its output terminal Q, and maintains the voltage level of the completion signal CA at the H level. The RS flip-flop circuit 11-9 also receives the fourth output signal A04 from the OR gate 11-8, at its reset terminal R. While the voltage level of the fourth output signal A04 is at the L level, the RS flip-flop circuit 11-9 maintains the voltage level of the completion signal CB. When the voltage level of the fourth output signal A04 is changed to the H level, the voltage level of the completion signal CB is changed to the L level. While the counting result of the counter 11-7 does not reach the predetermined number, the voltage level of the completion signal CB is maintained at the L level.

The operation control signal ENC shown in FIG. 3 is inputted to the inverter 11-5a of the signal generation circuit 11-5, and the output of the inverter 11-5a is inputted to a set terminal S of the RS flip-flop circuit 11-5b. The completion signal CB is inputted to a reset terminal R of the RS flip-flop circuit 11-5b. The RS flip-flop circuit 11-5b outputs the interrupt control signal INTA from its reversed output terminal /Q. According to the signal generation circuit 11-5 in the initial condition, when the voltage level of the operation control signal ENC is at the H level, the voltage level of the completion signal CB is at the L level. Accordingly, since the RS flip-flop circuit 11-5b receives the signal having the L level at both the reset terminal R and the set terminal S, the voltage level of the interrupt control signal INTA outputted from the reversed output terminal /Q is at the H level. As described above with reference to FIG. 3, when the voltage level of the operation control signal ENC is changed to the L level thereafter, the voltage level of the interrupt control signal INTA is changed to the L level because the signal having the H level is inputted to the set terminal S of the RS flip-flop circuit 11-5b. Even if the voltage level of the operation control signal ENC is changed to the H level thereafter again, the voltage level of the interrupt control signal INTA is maintained at the L level. When the voltage level of the completion signal CB is changed to the H level, the voltage level of the interrupt control signal INTA is changed to the H level. Therefore, according to the signal generation circuit 11-5, while the voltage level of the completion signal CB is at the L level, the voltage level of the interrupt control signal INTA can be maintained.

The operation of the resume detection circuit 400 shown in FIG. 4 is explained with reference to the FIG. 1 and FIG. 3. As described above, when the USB control unit 10 is in the suspend mode, and when the MC unit 20 is in the stop mode, the voltage level of the first data D+ is maintained at the H level and the voltage level of the second data D− is maintained at the L level. Before the host device 200 transfers new data to the micro-controller 100, the host device 200 sends a massage, which shows the new data being transferred to the micro-controller 100. By sending the message, the voltage levels of both the first and second data D+, D− are maintained at the L level for a particular period after the voltage level of the first data D+ is changed to the L level and the voltage level of the second data D− is changed to the H level. Therefore, to detect the timing for resuming the operation of the USB control unit 10, the above-descried relationship between the first and second data D+, D− should be detected.

According the resume detection circuit 400 shown in FIG. 4, the counter 11-7 can receive the clock signal PO for the PLL circuit 60 in accordance to the following operation. When the second AND gate 11-2 shown in FIG. 3 detects that the voltage level of the first data D+ is changed to the L level and the voltage level of the second data D− is changed to the H level, the voltage level of the operation control signal ENC is changed to the H level. Then, the oscillating circuit 30 and the PLL circuit 60 is operated by the change of the voltage level of the operation control signal ENC. Accordingly, the counter 11-7 can receive the clock signal PO for the PLL circuit 60 without activating the MC unit 20 even if the MC unit 20 is in the stop mode.

When the AND gate 11-6 shown in FIG. 4 detects that the voltage levels of both the first and second data D+, D− are at the L level, the counter 11-7 is activated. The voltage level of the completion signal CB is changed to the H level when the counting result of the counter 11-7 reaches the predetermined number. When the OR gate 11-8 detect that both the first and second data D+, D− are not at the L level before the counting result of the counter 11-7 reaches the predetermined number, the counter 11-7 is reset and initialized. The voltage level of the completion signal CB is maintained at the L level while the counting result of the counter 11-7 does not reach the predetermined number. Accordingly, the resume detection circuit 400 can detect the resume mode. The counters 11-3, 11-7 may be replaced to a timer having its peripheral circuits.

According to the first embodiment of the invention, the oscillating circuit 30 can be commonly used for the USB control unit 10 and the MC unit 20. Therefore, the cost to form the micro-controller 100 can be reduced. Further, the USB control unit can control the activation of the oscillating circuit 30 without activating the MC unit 20 so that the operation of the USB control unit 10 can be resumed for the suspend mode faster than the release of the stop mode of the MC unit 20. Therefore, the micro-controller 100 can accept new data from the host device 200 at high speed. In the case that the PLL circuit 60 is formed in the micro-controller 100, the phase-lock process performed in the PLL circuit 60 takes a time. However, the micro-controller 100 of the first embodiment of the invention can activate the PLL circuit 60 prior to the release of the stop mode of the MC unit 20.

Figure 5:
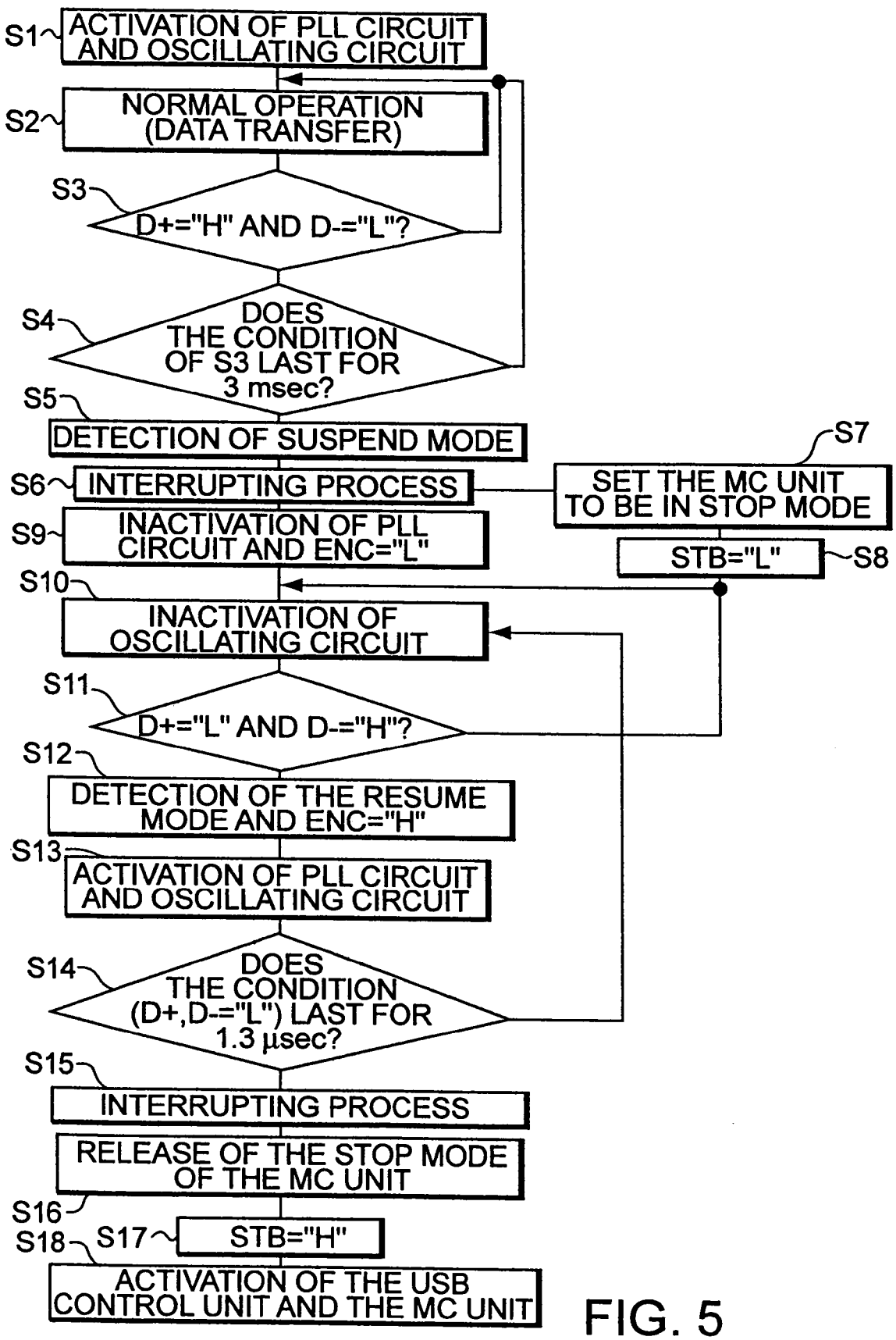
FIG. 5 is an operating flow chart of the micro-controller of FIG. 1.

The concrete operation of the micro-controller 100, specifically the operation for detecting the suspend mode and the resume mode, is explained below with reference to FIG. 5. Referring to FIG. 5, the PLL circuit 60 and the oscillating circuit 30 are activated (Step S1), and they are operable. Under this circumstance, since both the USB control unit 10 and the MC unit 20 are in the operation mode, the voltage levels of the oscillation control signal STB from the MC unit 20 and of the operation control signal STA, which is level-shifted from the operation control signal ENC, are at the H level. Accordingly, the voltage level of the NAND gate 31 is changed in response to the signals from the first and second terminals 5, 7 of the oscillating circuit 30. The voltage levels of both the interrupt control signal INTA and the interrupt control signal INTB are at the H level. The selection signals TEST and the reset signal RET maintain their voltage level of the normal operation mode.

The condition in step 1 is maintained, and the data transfer is performed (Step S2). The voltage levels of the first and second data D+, D− are changed in response to the transferred information, and then, the first and second data D+, D− are transferred. The counter 11-3 shown in FIG. 3 maintains the voltage level of the completion signal CA at the L level, and the counter 11-7 shown in FIG. 4 also maintains the voltage level of the completion signal CB at the L level. The voltage level of the operation control signal ENC is maintained at the H level, and the interrupt control signals INTA, INTB are also maintained at the H level.

The condition that the first data D+ is at the H level and the second data D− is at the L level is detected by the suspend mode detection circuit 200 (Step S3). If the condition is detected, then the operation goes to step 4. If the condition is not detected, the operation in step 2 is repeated.

When the condition that the first data D+ is at the H level and the second data D− is at the L level, is detected is detected, the period for maintaining the condition is detected (Step S4). When the condition that the first data D+ having the H level and the second data D− having the L level last for a predetermined period, ex 3 m second, is detected, the counting result of the counter 11-3 reaches the predetermined number. Then, the voltage level of the completion signal CA is changed to the H level. By changing the voltage level of the completion signal CA to the H level, the suspend mode is detected (Step S5). When the condition is not detected, the operation is returned to step 2.

When the suspend mode is detected, the operation control signal ENC is changed to the L level. Then, the interruption process is performed (Step 6). In the interruption process of step 6, the MC unit 20 is allowed to be in the stop mode by changing both of the voltage levels of the interrupt control signals INTA, INTB to the L levels.

In parallel to the interruption process that the MC 20 is allowed to be in the stop mode, the PLL circuit 60 is inactivated (Step S9). When the PLL circuit 60 is in the inactive state, the USB control unit 10 is inactivated. That is, the USB control unit 10 is in the suspend mode. Under this condition, although the voltage level of the operation control signal ENC is still in the L level, the voltage level of the oscillation control signal STB is maintained at the H level so that the oscillating circuit 30 is still in active state. Therefore, since the oscillation signal OSC can be inputted to the MC unit 20 continuously, the MC unit 20 can continue the pending operation even if the USB control unit 10 is in the suspend mode. When the pending operation in the MC unit 20 is completed, the MC unit 20 outputs the oscillation control signal STB having the L level.

After the pending operation in the MC unit 20 is completed, the MC unit 20 goes to the stop mode by the performance of the interrupt control signal INTB (Step S7). When MC unit 20 is changed to the stop mode, the voltage level of the oscillation control signal STB is changed to the L level (Step S8). As a result, the oscillating circuit 30 is inactivated (Step 10). While the first data D+ is at the H level and the second data D− is at the L level, the voltage level of the competition signal CA is maintained at the H level. Therefore, since the voltage level of the operation control signal ENC is maintained at the L level, the condition that the oscillating circuit 30 is inactivated, is maintained.

Then, when the condition that the first data D+ is changed to the L level and the second data D− is changed to the H level is detected, the counter 11-3 shown in FIG. 3 is reset and initialized by the second output signal A02 of the AND gate 11-2 (Step 11). Simultaneously, the voltage level of the operation control signal ENC is changed to the H level by the second output signal A02 of the AND gate 11-2 in order to detect the resume mode (Step S12). When voltage level of the operation control signal ENC is changed to the H level, the PLL circuit 60 and the oscillating circuit 30 are activated again (Step S13). Under this condition, the MC unit 20 is still in the stop mode.

The condition that the first data D+ is at the L level and the second data D− is at the L level, is detected, and a period ex, 1.3µ sec for lasting the condition is watched (Step S14). If the voltage level of the first data D+ is changed to the H level or if the voltage level of the second data D+ is changed to the H level before the counter 11-7 completes the counting operation corresponding to 1.3µ sec, it is considered that the voltage levels of the both the first and second data D+, D− are changed by an accident such as noise. When the USB control unit 10 responds to the condition as the resume mode, the MC unit 20 may malfunction. Therefore, in step 14, when the voltage levels of the both the first and second data D+, D− are changed by an accident, the voltage level of the interrupt control signal INTB is maintained at the L level to maintain the MC unit 20 in the stop mode by watching the first and second data D+, D− in the watching unit 15 shown in FIG. 1, and the oscillating circuit 30 is inactivated again. It is possible to return the operation to step 3, and the voltage level of the operation control signal ENC is changed to the L level. It is also possible to form a circuit to make the voltage level of the operation control signal ENC change to the L level compulsorily in response to the voltage level of the completion signal CB. The former is favorableness as to the cost performance because it is not necessary to form any additional circuit. The latter is favorableness as to the low power consumption because the oscillating circuit 30 can be inactivated without waiting the counting result of the counter 11-3. In response to the inactivation of the oscillating circuit 30, the PLL circuit 60 is inactivated again.

When the condition that the first data D+ is at the L level and the second data D− is at the L level, is detected, and when a period ex, 1.3 µsec for lasting the condition is also detected, the voltage level of the completion signal CB is changed from the L level to the H level. When the voltage level of the completion signal CB is changed to the H level, the voltage level of the interrupt control signal INTA is changed to the H level by the signal generating circuit 11-5. In response to the change of the voltage level of the interrupt control signal INTB, which is level-shifted from the interrupt control signal INTA, from the L level to the H level, the MC unit 20 is allowed to release its stop mode by the interrupting operation (Step S15).

Then, the MC unit releases its stop mode (Step S16), and outputs the oscillation control signal STB having the H level (Step S17). As described above, the oscillating circuit 30 is activated before the voltage level of the oscillation control signal STB is changed to the H level. As a result, the USB control unit 10 and the MC unit 20 are activated (Step 18) and are returned to the normal operation.

According to the micro-controller 100 of the first embodiment of the invention, the oscillating circuit 30 can be commonly used for the USB control unit 10 and the MC unit 20. The cost of the micro-controller can be reduced. Further, according to the micro-controller 100 of the first embodiment, by watching the first and second data D+, D− in the watching unit 15, the halted oscillating circuit 30 can be activated without performing the software by the MC unit 20. As a result, the benefit regarding the low power consumption can be expected. Further, since the oscillating circuit 30 can be activated by the control of the watching unit 15 without the operation of the MC unit 20, the following benefits can be expected. First, the periods that the oscillation signal from the oscillating circuit 30 becomes in the stable condition and that the output signal PO from the PLL circuit 60 becomes in the stable condition, can be secured enough. Second, the mode of the micro-controller 100 can be changed from its inoperable mode to its operable mode very quickly. Third, accuracy for detecting the suspend mode or the resume mode and for transferring data can be improved.

Furthermore, according to the micro-controller 100 of the first embodiment, the suspend mode or the resume mode is detected by watching the first and second data D+, D−, it is not necessary to form a complicated circuit. Therefore, the cost can be reduced. Since the suspend mode or the resume mode is detected by watching the first and second data D+, D− based on the USB communication protocol, the transferred data can be received by the USB control unit 10 even if the USB control unit 10 was in the suspend mode.

Moreover, since the oscillating circuit 30 is commonly used and the increase of circuits accompanying the use of the oscillating circuit 30 commonly is suppressed, the number of the terminals for connecting to the external oscillators is not increased. Further, since suffocating the increase of the integration is reduced as possible, the micro-controller 100 of the first embodiment is capable of a single resin-sealed semiconductor device.

Various other modifications of the illustrated first embodiments will be apparent to those skilled in the art on reference to this description. According to the first embodiment, although the suspend mode or the resume mode are detected by the condition of the first and second data D+, D− based on the communication protocol in view of using the USB, the detection of the suspend mode or the resume modem can be performed by the other method. Further, the first embodiment can be capable of the micro-controller without using the USB. For example, when a micro-controller recognizes the condition that there is no data transmission or the condition that operation of the USB control unit 10 should be resumed from a transferred data having one bit or more in view of its communication protocol or its data transferring condition, it is not necessary to use the second data D−, which is complement data of the first data D+. In such a micro-controller, since the suspend mode or the resume mode are detected by watching the transferred data of one bit or more, the first embodiment can be applied. Further in such a micro-controller, the transferred data having two bits or more to be watched may be favorable to perform the stable operation because the accidental data such as noise can be detected by the transferred data having two bits or more.

Further, the counter 11-3 and the counter 11-7 can be used commonly for the suspend mode detection circuit 200 of FIG. 3 and the resume mode detection circuit 300 of FIG. 4 when they use the same counting value. Furthermore, although the USB control unit 10 is operated by the oscillation signal having 48 MHz under the USB 1.1 standard, the USB may be operated by the oscillation signal having a certain frequency, which is regulated by new standard. Since the frequency dividing circuit 70 and the PLL circuit 60 is formed in the first embodiment, the micro-controller 100 can meet the new standard easily.

Second Preferred Embodiment

Figure 6:
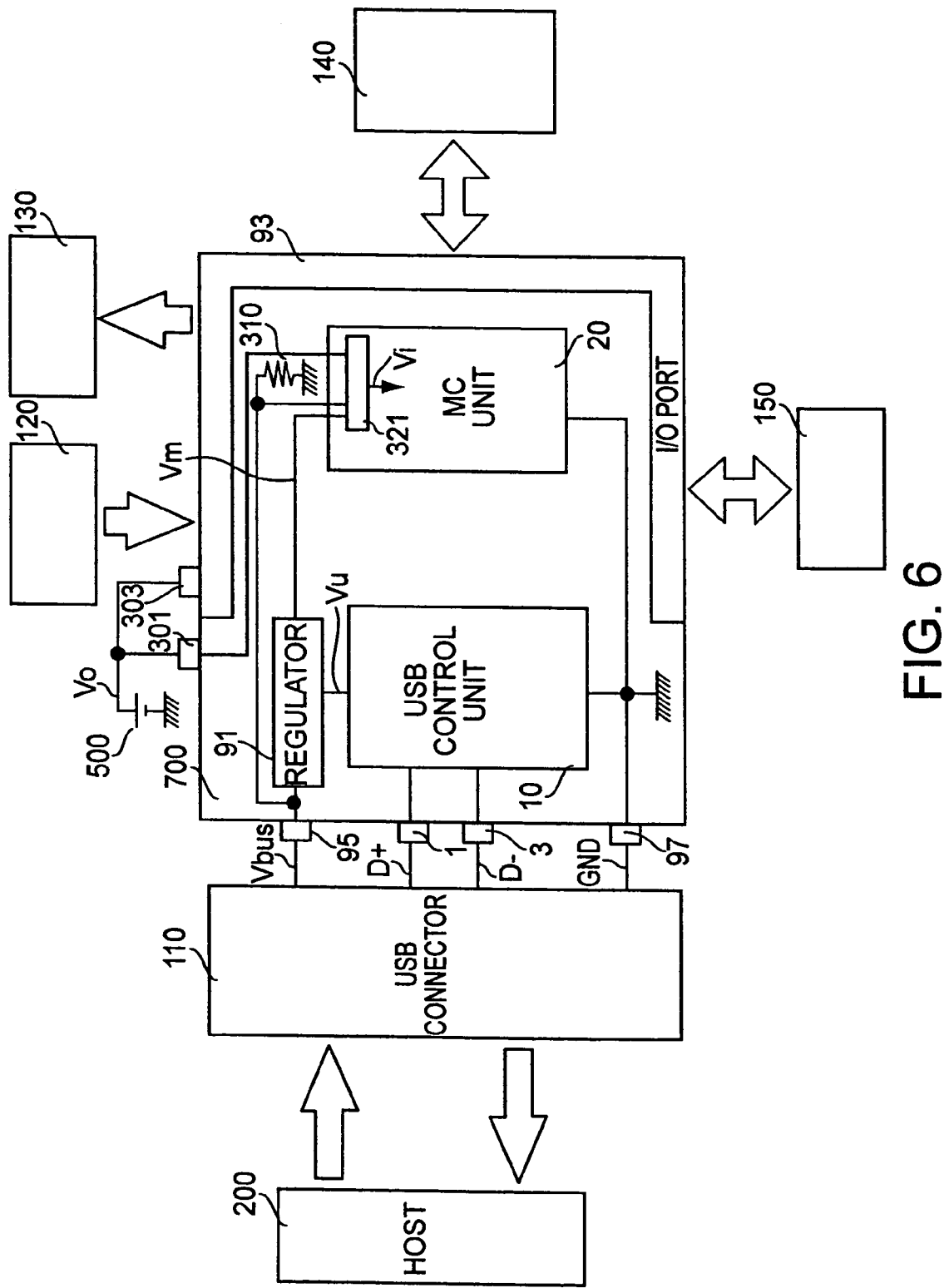
FIG. 6 is a diagram showing an alternative total system utilizing the micro-controller of a second embodiment of the invention.
Figure 7:
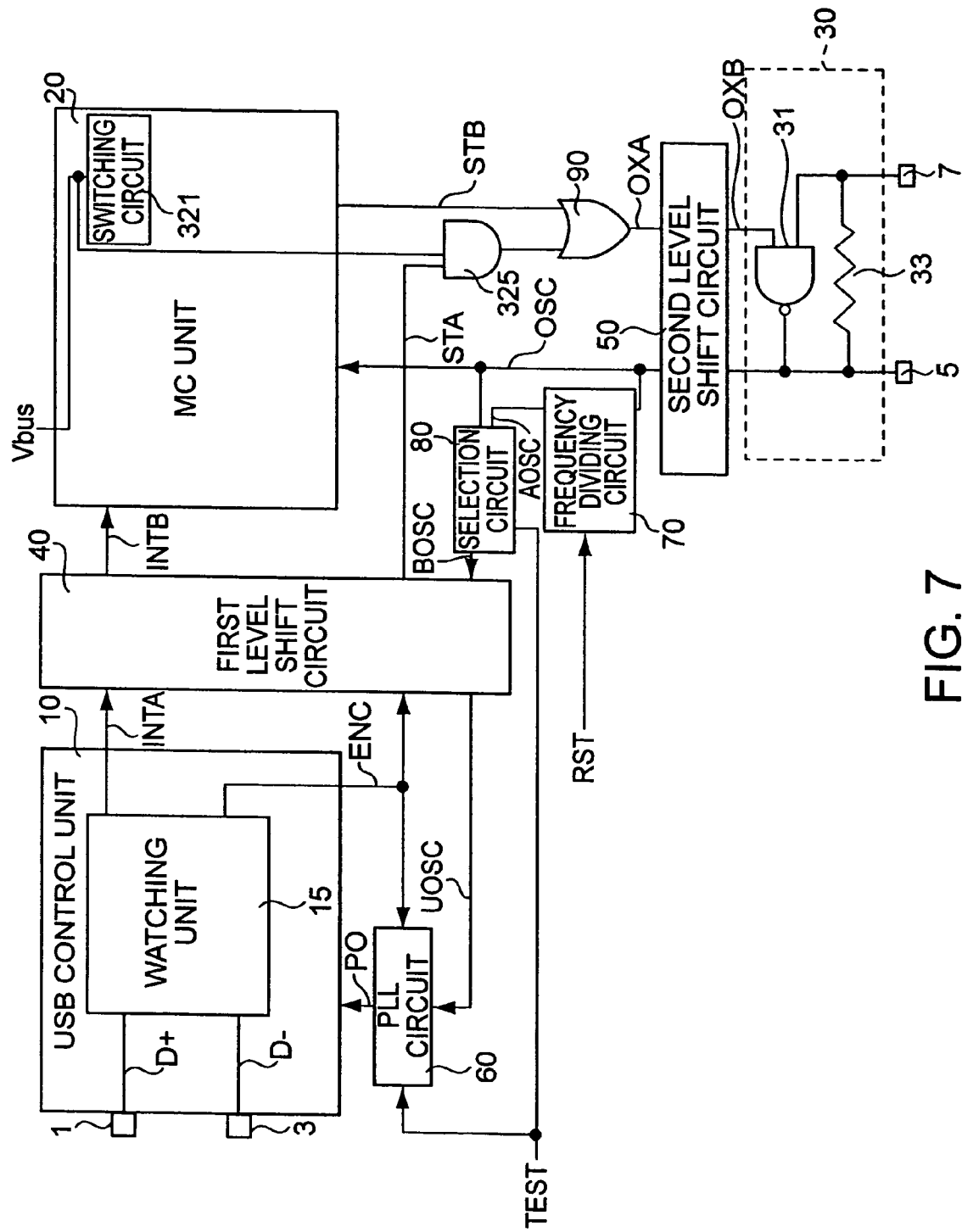
FIG. 7 is a circuit diagram of a micro-controller according to the second embodiment of the invention.

A micro-controller 700 of the second embodiment is shown in FIGS. 6 and 7. In the second embodiment, the micro-controller 700 using the BUS-POWERED method is explained. The same reference numbers in FIGS. 1 through 5 designate the same or similar components in the second embodiment shown in FIGS. 6 and 7.

Referring to FIG. 7, comparing to the micro-controller 100, the micro-controller 700 further includes an AND gate 325 having two inputs and one output, and the MC unit 20 includes a switch circuit 321. The AND gate 325 receives the operation control signal STA, which is level-shifted from the operation control signal ENC outputted from the watching unit 15 by the first level shift circuit 40, at one of its two input, and the AND gate 325 also receives the voltage Vbus, which is supplied from the host device 200 though the USB connector 110, at the other input. The output of the AND gate 325 is inputted to one of two input of the OR gate 90. The benefit for using the AND gate 325 is explained below with reference to FIG. 6.

As described above, in the micro-controller 700 in which the BUS-POWERED method is applied, the switch circuit 321 is formed in the MC unit 20. The switch circuit selects either the voltage Vm, which is regulated from the voltage Vbus by the regulator 91, or the voltage Vo, which is supplied from the external power supply source 500 through a terminal 301, in response to the voltage Vbus, and outputs a power supply voltage Vi selectively as the power supply of the MC unit 20. For example, when the host device 200 is connected to the USB connector 110, the voltage Vbus having 5V is applied to the switch circuit 321. Therefore, since the power supply voltage can be supplied from the host device 200 to the MC unit 20, the switch circuit 321 selects the voltage Vm, and the outputs the voltage Vm as the voltage Vi. According to the first embodiment, to avoid the complicated explanation, it was explained that the voltage Vm is used for the power supply voltage of the MC unit 20. When the host device 200 is not connected to the USB connector 110, the voltage Vbus is in the floating state. However, since a pull-down resistor 310 is connected the USB connector 110, the voltage level of the voltage Vm is pulled to the ground level. Therefore the voltage Vm having the ground level is supplied to the switch circuit 321. Accordingly, it is impossible to supply the power supply voltage from the host device 200 to the MC unit 20, the switch circuit selects the voltage Vo and the outputs the voltage Vo as the voltage Vi. According to the connection described above, the power supply voltage is always supplied to the MC unit 20. Therefore, the peripheral circuits 120 through 150 can be operated by the MC unit 20 regardless whether or not the host device 200 is connected to the micro-controller 700. The voltage Vo is supplied to the I/O port 93 through a terminal 303 as the power supply voltage.

Since the power supply voltage is always supplied to the MC unit 20 in the second embodiment, the oscillation control signal for activating the oscillating circuit 30 can be generated. However, since the power supply voltage Vu of the USB control unit 10 is generated by the voltage Vbus according to the, first and second embodiment, the power supply voltage Vu of the USB control unit 10 is not generated when the host device 200 is not connected to the micro-controller 700 or 100. Therefore, in the micro-controller 100, the function of the USB control unit 10 is not performed so that the voltage level of the operation control signal ENC from the watching unit 15 becomes unstably. Accordingly, the oscillation control signal STA also becomes unstably. Under this condition, when the voltage level of the oscillation control signal STA is changed to the H level, the voltage level of the output from the OR gate 90 is fixed to the H level even if the oscillating circuit 30 should be in inoperable mode. Therefore, the oscillating circuit 30 is always activated in response to the oscillation control signal STA having the H level, regardless the voltage level of the oscillation control signal STB. Further, the MC unit 20 can not control the watching circuit 15 regarding the operation control signal ENC because the power supply voltage is not supplied to the USB control unit 10.

This problem can be resolve to form another switch circuit in the USB control unit 10 for supplying power supply voltage based on the voltage Vo to the watching unit 15 all the time. However, if the another switch circuit is formed in the USB control unit 10, the cost is increased. According to the micro-controller 700, the problem described above can be resolved by using the AND gate 325 without modifying the USB control unit 10.

According to the micro-controller 700, even if the unstable oscillation control signal STA is outputted, the unstable oscillation control signal STA is inputted to the AND gate 325, not the OR gate 90. And, the AND gate 325 receives the voltage V bus having the ground level at the other input. Therefore, whenever the micro-controller 700 is not connected to the host device 200, the voltage level of the output of the AND gate 325 is maintained at the L level regardless the voltage level of the oscillation control signal STA. Accordingly the oscillating circuit 30 can be halted by the oscillation control signal STB from the MC unit 20. When the voltage Vbus is supplied to the micro-controller 700, the voltage level of the output from the AND gate 325 is changed by the voltage level of the oscillation control signal STA because the voltage Vbus having the H level is inputted to the other input of the AND gate 325. Therefore, the micro-controller 700 is connected to the host device 200, the operation of the micro-controller 700 can be expected to be the same as that of the micro-controller 100.

Further, although the USB control unit 10 in the micro-controller 700 receives its power supply voltage from the host device 200 by the BUS-POWERED method, the USB control unit 10 may received its power supply voltage from another source such as an independent battery other than the host device 200. In this case, when the micro-controller 700 is not connected to the host devices 200, the first data terminal 1 for sending or receiving the first data D+ is set at the power supply voltage by forming a pull-up resistor, and the second data terminal 1 for sending or receiving the second data D− is set at the ground voltage by forming a pull-down resistor. So, the USB control unit 10 can be set to the suspend mode by the operation for detecting the suspend mode. Accordingly, when the peripheral device having the micro-controller 700 is not connected to the host devices 200, the USB control unit 10 can be set to the suspend mode so that the power consumption can be reduced. Further, it is not necessary to form an addition circuit to recognize the condition for disconnecting the host device 200 and the peripheral device having the micro-controller 700. Therefore, the size of the chip in which the micro-controller is formed can be reduced, and the cost can be reduced by reducing the circuit element.

While the present invention has been described with reference to illustrative embodiments, this description is not intended to be construed in a limiting sense. Various other modifications of the illustrated embodiments, as well as other embodiments of the invention, will be apparent to those skilled in the art on reference to this description. Therefore, the appended claims are intended to cover any such modifications or embodiments as fall within the true scope of the invention.

We claim:

1. A micro-controller having circuits and controlling data transfer to or from an external device through a data line, comprising:
   an oscillating circuit operating to generate an oscillation signal in response to a logic level of an oscillating control signal;
   a transfer control unit receiving data through the data line and transferring data to be transmitted to the external device, the transfer control unit being operated in response to the oscillation signal and outputting a first signal;
   a main control unit generating signals, which control the circuits in the micro-controller, the main control unit being operated in response to the oscillation signal and outputting a second signal;
   an oscillating control circuit outputting the oscillating control signal whose a logic level is determined by logic levels of the first and the second signals, wherein the first and the second signals are asynchronous to each other.

2. A micro-controller according to claim 1, wherein the oscillating circuit generates the oscillating signal when the oscillating control signal has a first logic level, and the oscillating circuit stops generating the oscillating signal when the oscillating control signal has a second logic level, and the oscillating control signal has the first logic level when at least either the first or the second signal has a logic level, which indicates a generation of the oscillating signal, and the oscillating control signal has the second logic level when both the first and the second signals have a logic level, which indicates to stop generating the oscillating signal.

3. A micro-controller according to claim 1, wherein the transfer control unit has a monitoring circuit monitoring a receiving state of the data, the monitoring circuit outputting the first signal, which has a logic level determined by the receiving state.

4. A micro-controller according to claim 2, wherein the transfer control unit has a monitoring circuit monitoring a receiving state of the data, the monitoring circuit outputting the first signal, which has a logic level determined by the receiving state.

5. A micro-controller according to claim 4, wherein the first signal has a logic level, which indicates to stop generating the oscillating signal when the monitoring circuit detects condition that the data is not changed for a certain period.

6. A micro-controller according to claim 1, wherein the data is a pair of first and second data for a USB data transfer.

7. A micro-controller according to claim 3, wherein the data is a pair of first and second data, and the monitoring circuit outputs the first signal having a logic level, which indicates to stop generating the oscillating signal when both the first and the second data have a same logic level for a certain period.

8. A micro-controller according to claim 1, wherein the main control unit is able to be supplied a voltage as a supply voltage from the external device, and the second signal has a logic level, which indicates a generation of the oscillating signal, while the voltage is being supplied to the main control unit.

9. A micro-controller according to claim 1, wherein the micro-controller is formed on a single semiconductor chip.

10. A micro-controller according to claim 1, wherein the micro-controller is a packaged semiconductor device.

11. A micro-controller having circuits and controlling data transfer to or from an external device through a data line, comprising:
    an oscillating circuit being controlled to generate an oscillation signal in response to a logic level of an indicating signal;
    a transfer control unit receiving data through the data line and transferring data to be transmitted to the external device, the transfer control unit being operated in response to the oscillation signal and outputting an interrupting signal, which includes information possible to make the operation of the transfer control unit stop;
    a main control unit generating signals, which control the circuits in the micro-controller, the main control unit being operated in response to the oscillation signal and outputting the indicating signal, wherein a logic level of the indicating signal is able to set a logic level that indicates to halt the oscillating circuit according to the interrupting signal, which has the information, wherein the indicating signal and the interrupting signal are asynchronous to each other.

12. A micro-controller according to claim 11, wherein the oscillating circuit generates the oscillation signal in response to a first logic level of the indicating signal and stops generating the oscillation signal in response to a second logic level of the indicating signal, the indicating signal is set at the first logic level when at least either the transfer control unit or the main control unit is to be operated, and the indicating signal is set at the second logic level when both the transfer control unit and the main control unit are not to be operated.

13. A micro-controller according to claim 12, wherein the transfer control unit has a monitoring circuit, which detects the data in its non-operation state and outputs a detecting signal, wherein the indicating signal is set at the first logic level in response to the detecting signal regardless of the state of the main control unit.

14. A micro-controller according to claim 11, wherein the transfer control unit has a monitoring circuit, which detects the data in its non-operation state and outputs a detecting signal, wherein the oscillating circuit is operated to generate the oscillation signal in response to the detecting signal regardless of the logic level of the indicating signal.

15. A micro-controller according to claim 11, wherein the data is a pair of first and second data for an USB data transfer.

16. A micro-controller according to claim 14, wherein the data is a pair of a first and a second data, and the monitoring circuit detects a receiving state of the data by judging whether both the first and second data have a same logic level or not, for a certain period.

17. A micro-controller according to claim 11, wherein the micro-controller is formed on a single semiconductor chip.

18. A micro-controller according to claim 11, wherein the micro-controller is a packaged semiconductor device.

19. A method of controlling to generate an oscillation signal in a micro-controller, which controls data transfer to or from an external device through a data line, the micro-controller having circuits, an oscillating circuit being controlled to generate the oscillation signal in response to a logic level of a oscillating control signal, a transfer control unit receiving data through the data line and transferring data to be transmitted to the external device, and a main control unit generating signals to control the circuits, wherein the oscillation signal is used to operate at least the transfer control unit and the main control unit, comprising:

stopping a generation of the oscillation signal when the oscillating control signal has a second logic level, wherein the oscillating control signal has the second logic level when both the transfer control unit and the main control unit are in a non-operation state; and resuming a generation of the oscillation signal when the oscillating control signal has a first logic level, wherein the oscillating control signal has the first logic level in response to a first signal indicating that the transfer control unit is in the operation state and a second signal, which is asynchronous with the first signal, indicating that the main control unit is in the operation state.

20. A method according to claim 19, wherein resuming a generation of the oscillation signal includes detecting a data receiving condition of the transfer control unit, the oscillating control signal being set to the first logic level when the transfer control unit is the non-operation state detects data being received.

21. A method according to claim 19, wherein the data is a pair of first and second data for a USB data transfer, and stopping a generation of the oscillation signal includes detecting a data receiving condition of the transfer control unit, the oscillating control signal being set to the second logic level when both the first and second data have a same logic level for a certain period.

* * * * *